Sept. 30, 1958 H. HORN 2,854,500
HIGH TENSION PRESSURE CABLE
Filed Feb. 17, 1954
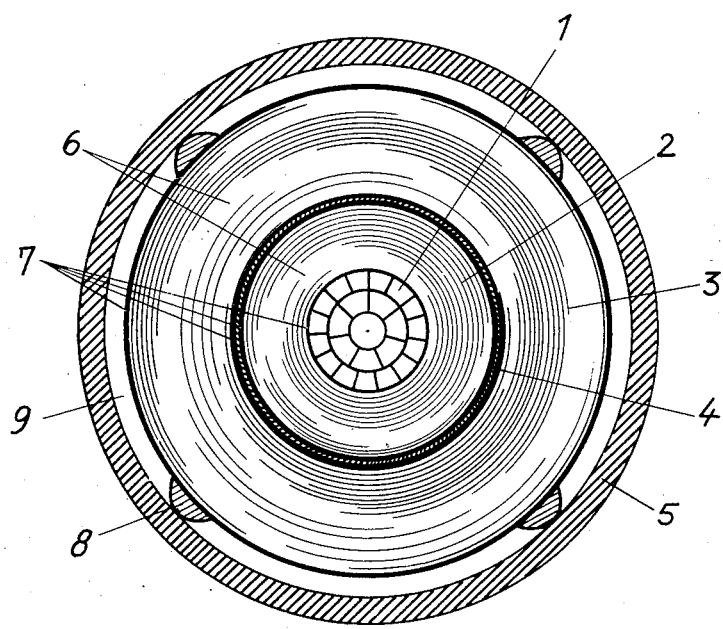
Inventor
H. Horn

United States Patent Office 2,854,500
Patented Sept. 30, 1958

2,854,500

HIGH TENSION PRESSURE CABLE

Heinz Horn, Koln-Mulheim, Germany, assignor to Felten & Guilleaume Carlswerk Aktiengesellschaft, Koln-Mulheim, Germany Application February 17, 1954, Serial No. 410,862

Claims priority, application Germany May 26, 1953

2 Claims. (Cl. 174—28)

In the high tension pressure cables hitherto usual which comprise an insulation built up by winding of paper, foils of synthetic resins, or the like, two fundamentally different kinds come into question. In the one form of construction, the pressure medium is separated from the insulation impregnated in the usual way by an intermediate wall which yields to pressure but is impermeable to gases and liquids. The insulated cable core together with its intermediate wall lies within a pressure resisting pipe with a free space in between, which space is filled with a gaseous or liquid pressure medium. Thus, the pressure of the pressure medium is transmitted through the said intermediate wall to the insulation of the cable. In the other form of construction, the pressure medium is in direct contact with the wound-on insulating layer of the cable. Also in this case use may be made of an impregnating means, in addition to the pressure medium, which impregnating means should, however, have a drip point which is so high that the impregnating means will not flow at the operating temperature of the cable. This is required in order that the impregnating means shall not stop up the cross-section of the passage for the pressure medium, and thereby prevent its mobility in the longitudinal direction of the cable. If a gaseous pressure medium is used, the cable is referred to as an "internal gas pressure cable." Naturally, with such cables it is not possible to obtain the high electrical potential gradients which the pressure cable construction above first described can safely cope with.

In addition to these well defined constructions, other intermediate constructions are, of course, possible. Thus, for instance, it is known to build up the insulation of a pressure cable in two different parts, of which the inner part is filled with an impregnating means which has such a high drip-point that it does not flow at the operating temperature of the cable, whilst the outer part, which is concentrically mounted on the inner part is filled with a gas of normal or increased pressure. However, in this case the gas can penetrate also into the inner part of the insulation by diffusion and through any gaps that may exist, or be produced, for which reason this cable can hardly behave better in the electrical respect than the internal gas pressure cable.

The high tension pressure cable according to the invention consists, like the cable just described, of an inner part filled with an impregnating means and an outer part which is concentrically provided thereon and is filled with pressure gas. However, according to the invention, the inner part of the insulation, which is completely filled with impregnating means, is separated from the outer part by an intermediate wall, which yields to pressure but is impermeable to gases and liquids. This separating intermediate wall, which preferably consists of a thin seamless metal sleeve, for instance of lead or aluminum, is preferably embedded, closely fitting, between the abutting layers of the two insulating parts, in order to prevent the production of folds in the intermediate wall during the temperature changes in the cable insulation and the alternate expansions and contractions thereby produced. Thus, the cable according to the invention is built up in the interior part of the insulation like a pressure cable, in which the impregnating means is separated from the pressure medium by a pressure-yielding but impermeable intermediate wall. However, in the outer part of the insulation the cable is entirely similar to an internal gas pressure cable.

One construction according to the invention is illustrated in cross-section diagrammatically and by way of example, in the accompanying drawing.

Referring to the drawing, 1 is the conductor of the cable, the cross-section of which may be slightly oval, or of non-circular or circular cross-section, 2 is the inner part, and 3 the outer part of the insulation, 4 is the separating intermediate wall provided between the two parts, and 5 is the cable sheathing. The inner part 2 and the outer part 3 of the insulation are obtained by wound-on bands 6, which may consist of paper or of foils of synthetic material for instance polystyrol. The part 2 of the insulation is completely impregnated with an impregnating means, for instance a suitable compound. The bands 6 are used in the outer part 3 of the insulation are preferably impregnated in the case of paper with an impregnating medium which is still plastic or viscous also at the operating temperature of the cable. In this case use may be made of pre-impregnated bands, but it is also possible to impregnate the bands slightly after the winding as in the insulation of a drain type cable (non bleeding). A covering 7 of a material of high electrical conductivity consisting, for instance, of one or more layers of paper filled with carbon black, or the like, is provided on the conductor 1, on both sides of the separating intermediate wall 4, as well as on the surface of the outer insulating part 3. The layers 7 on the inner and outer surface of the insulation serve to limit the field, and on the two sides of the separating intermediate wall 4, they serve, in addition thereto, as a cushion for the intermediate wall firmly embedded between the parts 2 and 3 of the insulation. Wires 8 wound in an open helix on the outer surface of the insulating part 3 act as distance members, in order to form a free passage 9 for the flow of the pressure gas under the cable sheathing 5.

Since the separating intermediate wall 4 is firmly held between the two parts 2 and 3 of the insulation, it can follow the volume changes of the inner insulation 2, caused by temperature variations, only to a very limited extent. These volume changes are mainly due to the heat expansion of the impregnating medium. It is therefore important to reduce the impregnating means to a minimum in the part of the cable core lying under the intermediate wall 4. For this purpose, use is made in the inner part 2 of the insulation preferably of impermeable bands of synthetic material, or paper the absorbent capacity of which has been greatly reduced by strong calendering. Moreover, it is advisable that the filling factor of the conductor 1 shall be made as high as possible, for instance by filling the entire cross section of the conductor with closely packed stranded wires or by strongly compressing the conductor by rolling or hammering, in order thereby to reduce as much as possible also the proportion of the impregnating means in the conductor itself.

In order best to utilize the insulating materials of both parts 2 and 3 of the insulation, it is advisable so to dimension these two parts that the electric stressing in the insulation on the surface of the conductor and in the insulation on the outer surface of the separating intermediate wall 4 show the same degree of safety.

The wires 8, which are inserted between the outer part 3 of the insulation and the cable sheathing 5 and act as distance holders, have preferably the cross-section of a segment of a circle and they are preferably so arranged that they lie on the cable core with their flat surface. They may consist, for example, of copper or aluminium.

The cable sheathing 5, for instance of aluminium, is preferably so firmly pressed on the wires 8 that a relative displacement between the cable sheathing and the individual parts of the cable core, due to different heat expansions of these parts, is impossible. This is important in order to avoid variations in the lengths of the individual parts of the cable in the sleeves and junction boxes, due to temperature variations.

I claim:

1. An electric high tension cable comprising a conductor of high filling factor, an insulation wound on the said conductor, a sheathing, the said insulation consisting of an inner part completely impregnated with an impregnating means and an outer part partly filled with impregnated bands and partly filled with gas the pressure of which is higher than atmospheric pressure, an intermediate wall separating the said inner from the said outer part and which yields to pressure but is impermeable to gases and liquids and is capable of transmitting the gas pressure from the outer part to the inner part, and padding layers of increased electrical conductivity between the said intermediate wall and the abutting layers of the said two parts of the insulation, and also between the conductor and the inner part of the insulation, and between the outer impregnated insulation and the pressure gas surrounding it.

2. An electric high tension cable, comprising: a conductor of high filling factor, inner insulation surrounding the conductor and consisting of relatively non-absorbent wound-on bands completely impregnated with an impregnating means, an intermediate wall surrounding the inner insulation and consisting of a thin seamless metal sleeve which yields to pressure but is impervious to gases and liquids, outer insulation, surrounding the intermediate wall and including wound-on bands impregnated with an impregnating means, and also including a gas at a pressure higher than atmospheric pressure, conductive coverings of paper filled with carbon black between the conductor and the inner insulation, on the inner and outer surfaces of the intermediate wall, and on the outer surfaces of the impregnated bands of the outer insulation, cable sheathing surrounding the outer insulation and enclosing the said pressure gas, and wires of segmental cross section wound in an open helix upon the impregnated bands of the outer insulation and gripped between the said outer impregnated bands and the cable sheathing.

References Cited in the file of this patent

UNITED STATES PATENTS

| | | |
|---|---|---|
| 2,038,894 | Del Mar | Apr. 28, 1936 |
| 2,132,259 | Emanueli | Oct. 4, 1938 |
| 2,134,771 | Aime | Nov. 1, 1938 |
| 2,658,939 | Greenfield et al. | Nov. 10, 1953 |

FOREIGN PATENTS

| | | |
|---|---|---|
| 41,532 | Austria | Mar. 25, 1910 |
| 138,935 | Austria | Oct. 10, 1934 |
| 614,744 | Great Britain | Dec. 22, 1948 |